Dec. 10, 1963     C. W. MUSSER     3,113,415
WAVE ENERGY METHOD AND APPARATUS FOR TIME-DETERMINATION
Filed Feb. 26, 1962     3 Sheets-Sheet 1

$Lt = I\omega = Mr_1^2 \omega_1 = Mr_2^2 \omega_2$

INVENTOR.
C. WALTON MUSSER
BY Wm. H. Maxwell
AGENT

Dec. 10, 1963     C. W. MUSSER     3,113,415
WAVE ENERGY METHOD AND APPARATUS FOR TIME-DETERMINATION
Filed Feb. 26, 1962     3 Sheets-Sheet 2

INVENTOR.
C. WALTON MUSSER
BY
    H. Maxwell
          AGENT

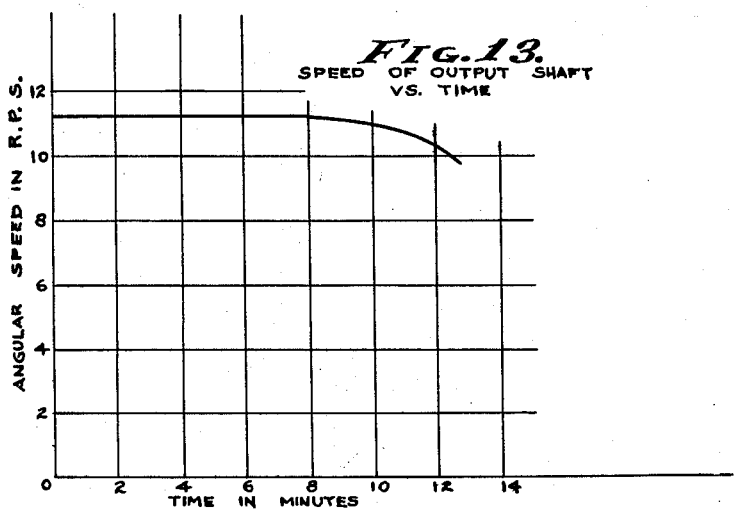
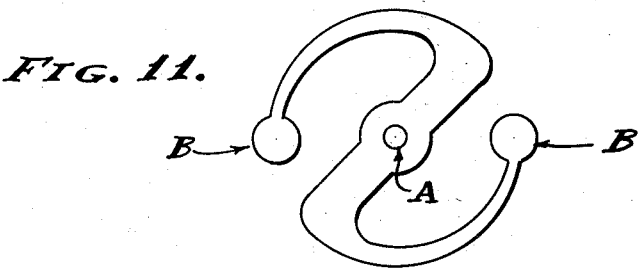
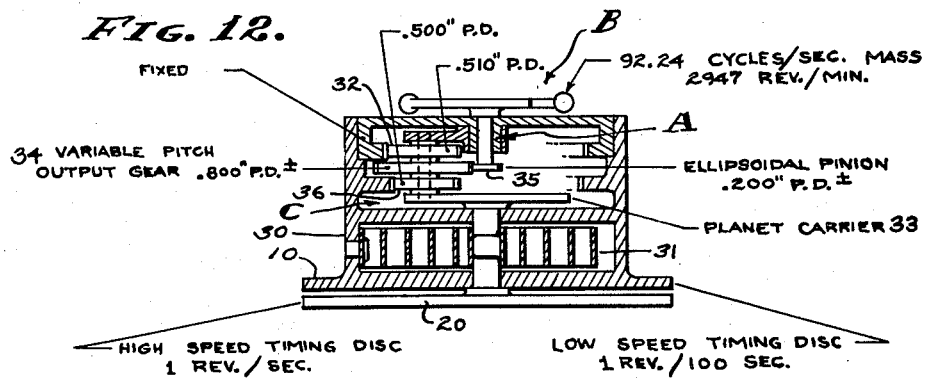

United States Patent Office 3,113,415
Patented Dec. 10, 1963

3,113,415
WAVE ENERGY METHOD AND APPARATUS FOR TIME-DETERMINATION
C. Walton Musser, Beverly, Mass., assignor to Harvey Aluminum (Incorporated), Torrance, Calif., a corporation of California
Filed Feb. 26, 1962, Ser. No. 176,491
8 Claims. (Cl. 58—2)

This invention relates to the determination of time intervals, particularly by means of devices, and has for its main objective, accurate and reliable and precise timing.

This invention employs unique principles involving a new fundamental concept utilizing a continuous flow of energy interexchange. That is, through a rotating elastically constrained mass, an isochronal variation in rotational velocity synchronizes and interlocks with a non-linear motion to produce an accurate controlled constant angular velocity. One of the most basic and accurate time constants known to man is the reciprocal conversion of kinetic and potential energy within an elastic medium, and this time constant is applied to the mechanical timing device herein disclosed.

Mechanical time pieces are ordinarily composed of three basic interrelated mechanisms. The first of these provides the repeated cycle of precise time intervals, the second mechanically counts or adds these intervals, and, the third is the energy source providing the driving power. In most time pieces the second and third functions utilize gear trains of some type, and these trains are usually combined and used for both functions. The regulatory or time measuring function of time pieces is known generally as an escapement since it allows a captured tooth of the gear train to escape. The energy delivered by the power source to the final wheel of the train was historically used to oscillate a balance wheel, and since the period of oscillation was dependent upon the inertia of the balance wheel and the force acting against it a tremendous amount of effort was expended by horologists to provide a sufficiently uniform force output. The regulatory effect of a pendulum was later added, and a hairspring was added to the balance wheel. The interaction between a properly designed spring and the inertia of a rotating body produces a simple harmonic motion of a constant time period. Thus, ordinary time pieces need act only on the oscillatory time measuring system during a brief part of the time cycle, and this is at that portion of the time cycle where one tooth escapes or is dropped and the next tooth is placed in position for the succeeding cycle.

With the prior art timepieces, as referred to in general above, the gear train must accelerate to the velocity occasioned by the balance wheel, impart a small impulse, and then decelerate to a full stop, and within a small portion of each "tick" or time increment the entire gear train must be accelerated to its full maximum velocity and then positively brought to rest. This acceleration and deceleration must be accomplished in an exceedingly short time and the acceleration rates must be relatively high. For ordinary timepieces with a time interval of one-fifth of a second, for example, the escapement wheel is sufficiently sturdy without requiring an excessive mainspring, or power supply. However, the length of time of one time interval (one-fifth of a second) limits the accuracy to which time can be measured. Hence, when it becomes necessary to measure finer increments of time, it becomes necessary to decrease the time interval, or increase the number of "ticks" per second, and this imposes serious problems due to the inertia involved. Therefore, it becomes necessary to use stiffer springs and lighter masses in the balance wheel, resulting in a considerably smaller magnitudes of oscillation and with a relatively smaller factor of safety. It can be concluded, therefore, that ordinary mechanical timepieces of the conventional design referred to are limited by the inertia of their systems.

To summarize the deficiencies of the prior art timepieces it can be said that very small increments of time cannot be measured, accompanied with malfunctions of (1) failure to start, (2) failure to continue to operate, and (3) inaccuracy. It is an object of this invention to provide a timepiece or timer that is vastly improved in comparison to the ordinary prior art timer and wherein infinitely smaller increments of time are available for use, wherein starting is assured, wherein continuity of operation is assured, and wherein accuracy is also assured. For example, the present invention deals with a vibrating mass that oscillates at a substantially high frequency as compared with ordinary "ticking" devices, and as a result the divisions or increments of time are correspondingly small. Furthermore, starting and continuity of operation, and accuracy are all inherent in the oscillating mass involved, and which governs the speed of the drive therefor with extreme accuracy. Briefly, the instant device cannot miss a beat, nor can it jam, and on the contrary its operation is continuous and absolutely uniform.

It is an object of this invention to provide a timepiece or timer that requires but a minimum of driving force for its operation.

It is an object of this invention to provide a timepiece or timer that avoids the use of delicate and vulnerable parts and elements. Intricacy is virtually eliminated in this sense.

It is an object of this invention to provide a timepiece or timer by usefully employing, in combination, the principles of (1) conservation of angular momentum, (2) oscillation of a mass, and (3) non-linear motion. These principles are employed in a physical embodiment that is simple and rugged and which is easily manufactured and maintained.

The various objects and features of this invention will be fully understood from the following detailed description of the typical preferred form and application thereof, throughout which description reference is made to the accompanying drawings, in which:

FIG. 1 is a schematic drawing illustrating two masses which are the equivalent of the ends of a tuning fork.

FIG. 2 demonstrates the type of relationship existing between the mass involved and the radius about which it revolves.

FIG. 11 illustrates a preferred embodiment of the vibrating or oscillating mass.

FIG. 12 illustrates a physical embodiment of the invention in the form of a timer.

FIG. 13 illustrates the timing characteristics for a model of this invention.

Figure 1:
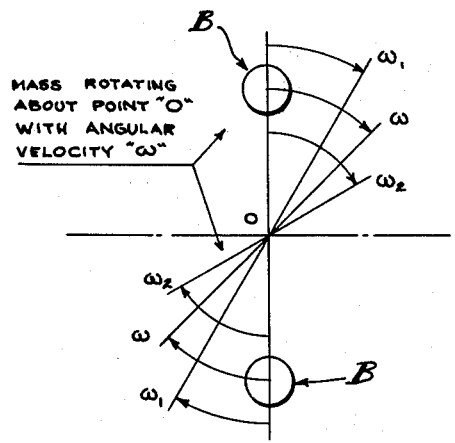

The timepiece or timer described herein utilizes a radially vibrating or oscillatory mass as a means of changing the angular velocity of a rotating shaft. Interconnected with said rotating shaft is a non-linear drive means that utilizes an essentially sinusoidal output to drive the rotating and oscillatory mass. Consequently, at a given speed determined by the simple periodic motion of the vibrating or oscillatory mass, there is a sympathetic relationship between the rotating mass and the drive means whereby they are locked together in synchronism and the rotative velocity of the drive means is governed by the radial vibrations or oscillations of the rotating mass. Essentially, there is the interexchange of potential energy into kinetic energy and back into potential energy as a means of regulating the rate of angular velocity change in the output of a drive means. In accordance with the invention the drive means has a sinusoidal output and when the period of the oscillating mass equals the period of said sinusoidal output the two are synchronously locked together. If the drive means tends to lead the oscillating means then there will be an increase in the interchange of energy, resulting in an increase in the amplitude of oscillation. Or, if the drive means tends to follow the oscillating mass, then there will be a decrease in the interchange of energy resulting in a decrease in the amplitude of oscillation.

Before describing a physical embodiment of the present invention the physical principles involved are explained as follows: The characteristic feature of the invention is that the device runs continuously during the timing period, and does not start and stop. On the contrary, it runs synchronously with an element having a change in angular velocity (speed of rotation) that is equivalent to a sine wave variation in the angular velocity. Instead of expended or lost energy, there is an interchange of energy due to the conservation of angular momentum. This is possible due to the vibration or oscillation of the mass in a radial direction in synchronism with a variation in the rotational velocity of the drive means. As a result, both the oscillating mass and varying drive inherently tend to remain sympathetic and in phase with each other. This phase relationship of oscillations in the two means, the vibrating mass and the varying drive means, establishes a "locked-in" condition which governs the speed of operation with exacting accuracy. It becomes apparent that the vibrating mass and varying drive operate or move rotationally as represented by a sinusoidal wave form. This sinusoidal wave form then represents a change in the angular velocity of the output from the drive means. In the form of invention shown, there are eight complete waves for each 360° rotation of an output driving gear, and two complete waves for each 360° of an output pinion. Here it can be seen that driving the output gear at a constant angular velocity will produce a variable angular velocity of the output pinion.

Figure 6:
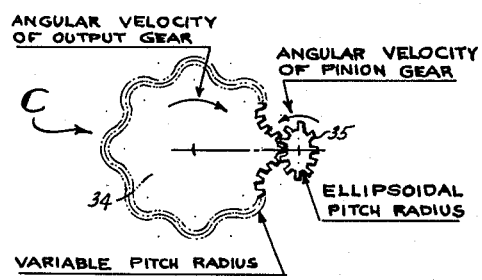
FIG. 6 illustrates the output gear and the pinion of the particular form of invention illustrated.

The timepiece or timer of the present invention is shown in FIGS. 6, 11, and 12 and involves, generally, a shaft A journalled for rotation, a mass B carried by the shaft A for radial oscillation while rotating, and a non-linear drive means C for propelling the shaft. The mass B and drive means C are matched in design so as to oscillate at a predetermined sinusoidal wave form, whereby an exacting speed of drive input is attained. In the form of invention illustrated, the mass B takes the form of a tuning fork, or the like, while the non-linear drive means C takes the form of a variable speed output toothed gear drive.

FIG. 1 shows a tuning fork representing the mass B to be oscillated. While the masses themselves are indicated in only one position, they are actually vibrating between the positions represented by the angular velocity vector line $\omega_1$ and $\omega_2$. Hence, the masses are vibrating or oscillating between the vector lines $\omega_1$ and $\omega_2$, $\omega_1$ being the largest diameter radius and $\omega_2$ being the smallest diameter radius. The angular velocity for a device of this nature is represented by the lines $\omega$, $\omega_1$ and $\omega_2$. Here it can be seen that for the conservation of angular momentum, as the radius is increased the angular velocity decreases, and as the radius is decreased the angular velocity increases. The formula noted below FIG. 1 is for the conservation of angular momentum. The values for the various items in this particular formula are: $L$=torque in the system, $t$=time in seconds, $I$=the moment of inertia of the system, $\omega$=the angular velocity in the system, $M$=the mass of the vibrating elements, $r$=the radius to the center of the mass from the center of rotation.

Figure 2:
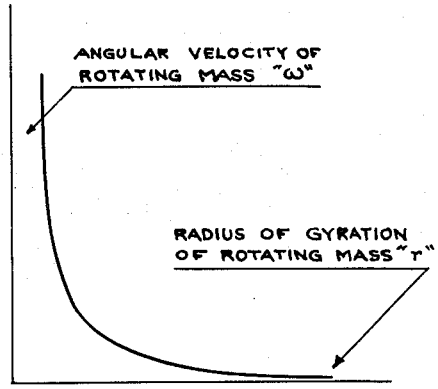

FIG. 2 shows a graphic representation of the mass to radius relationship wherefrom it can be seen that the angular momentum varies as the square of the radius and linearly with mass and rotational velocity. Hence, if the mass remains a constant and the angular momentum remains a constant, the angular velocity will vary inversely as the square of the radius. In the formula FIG. 1, $r_1$ and $\omega_1$ represent the conditions at one radius, and $r_2$ and $\omega_2$ the condition at a different radius.

Figure 3:
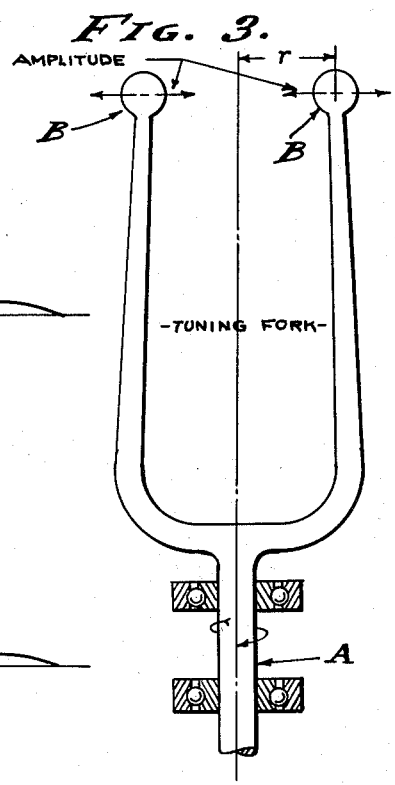
FIG. 3 illustrates a tuning fork having a concentration of mass at the ends of its tines.

The tuning fork of FIG. 3 is carried by the shaft A rotating in bearings 10. FIG. 3 is used to illustrate the in and out motion in a radial direction of the mass B upon vibration or oscillation of the tines. The radius to the center of the mass is demonstrated as being a small $r$.

Figure 4:
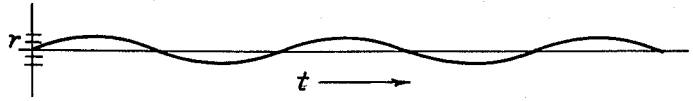
FIG. 4 is a graphic demonstration of the variation in radial movement of the mass with respect to time.

In FIG. 4 it can be seen that the radius $r$ will vary in a sinusoidal manner. The abscissa, in this particular case, is time $t$ and the ordinate is the radius $r$.

Figure 5:
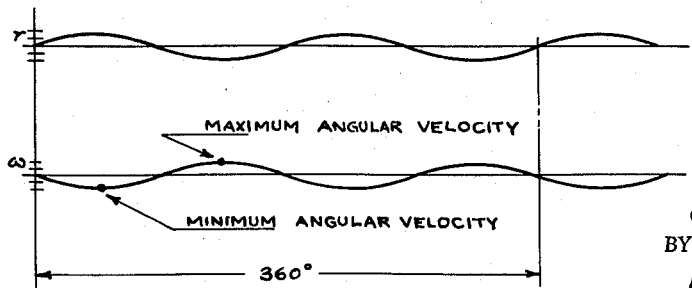
FIG. 5 illustrates the same variation shown in FIG. 4, but in respect to speed of rotation.

In FIG. 5 a comparison is made with respect to radius $r$ and speed of rotation or angular velocity $\omega$. For sake of illustration assume that there are two wave lengths of 360° rotation of the shaft (see FIG. 3). Hence, there will be two wave lengths in 360°. However, from FIG. 5, it can be seen that since there is a change in angular velocity with a change in radius that the crossover point will not be strictly on the 90° of ¼ of the rotation. For the purposes of this disclosure this discrepancy is of no consequence and can be disregarded. In the event that it is desired to be strictly perfect and have the wave form of the drive means C be equal to the wave shape of the oscillating mass B, then the contour of the output pinion (later described) can be refined so as to match the mass wave form completely. From FIG. 5, which is in terms of angular velocity, it can be seen that the angular velocity varies from a minimum to a maximum. These angular velocities, as depicted, would be the equivalency of the angular velocities from the vectors of FIG. 1. It can now be seen that in 360° rotation of the shaft that the angular velocity varies from a minimum to a maximum two times in more or less a sinusoidal fashion.

The output gear 34 of FIG. 6 is driven so as to tend to rotate at a substantially constant angular velocity, which velocity can be assumed to be uniform and it causes the pinion 35 to rotate at a variable angular velocity due to the change in pitch radius. It can be seen that the pitch radius along the major axis of the elliptical pinion 35 is greater than the pitch radius along the minor axis. Also, the pitch radius of the output gear 34 is made to vary from a corresponding maximum to minimum. This is accomplished by employing a wave form whereby the pitch radius of toothed engagement varies in a sinusoidal fashion.

Figure 7:
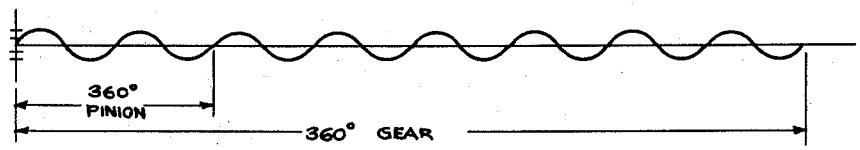
FIG. 7 illustrates the variation in the angular output of the pinion as the output gear is rotated at a constant angular velocity.

In FIG. 7 it can be seen that there will be as many waves as there are major pitch radius points on the output gear 34 and that there will be as many waves per output revolution of the pinion as there are waves on the pinion. It will be apparent to anyone skilled in the art that the representation of the pinion as being ellipsoidal is for the purposes of illustration and that other forms or equivalent drive means can be resorted to, as circumstances require. For example, in the manufacture of gears it is usually desirable that the gear tooth form be designed so that the action is conjugate. However, if this gear tooth form were made so that the teeth were not conjugate, then the output velocity of the pinion would have a wave form on it and the number of waves, in this particular instance, would be a function of the number of teeth on the pinion. Note that FIG. 7 does not take into account the effect of time. The abscissa is graphed strictly as one circumference of the drive gear and the ordinate illustrates the variation in angular velocity in relation to the position of the drive gear.

Figure 8:
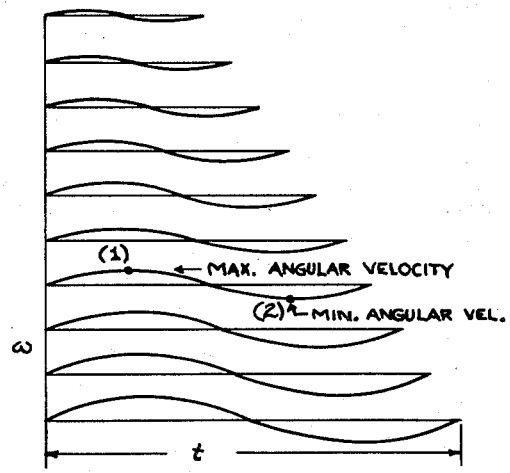
FIGS. 8, 9 and 10 are graphic illustrations of the wave forms involved.

FIG. 8, however, takes into account the effect of time. The abscissa is the time for one cycle and the ordinate is the angular velocity. Ten different angular velocities of the drive gear have been shown, and from this it becomes obvious that the slower the angular velocity of the drive gear, the longer will be required for one cycle to take place. On the contrary, as the angular velocity of the drive gear is increased, the wave length will become shorter. Again, we can see that for one wave length the angular velocity varies from a maximum at point 1 to a minimum at point 2. It is assumed that the output gear is being driven at a constant angular velocity.

Figure 9:
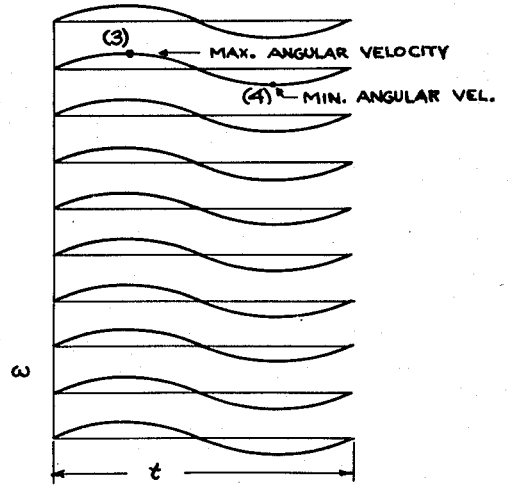

FIG. 9 illustrates the angular velocity relationships for the rotating tuning fork. Here it can be seen that there is a uniform wave length with respect to time regardless of the angular velocity of the tuning fork. Consequently, there is a maximum angular velocity and a minimal angular velocity in a given time period, and all of the ten waves depicted for ten different angular velocities of the shaft are the same. This is brought about by the vibrating mass in relation to the spring constant of the tuning fork. That is, with a given spring constant, a given mass will have a definite vibrating constant.

Figure 10:
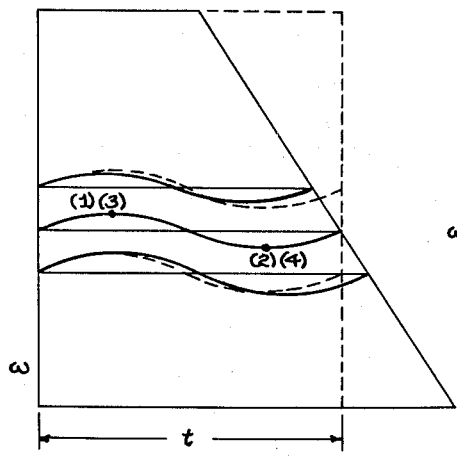

FIG. 10 illustrates the combination of FIG. 9 and FIG. 8, FIG. 8 being represented therein with solid lines and FIG. 9 with superimposed dotted lines. The wave forms are shown at three different levels of angular velocity and it can be seen that when the wave form of FIG. 8 matches the wave form of FIG. 9, the form of one wave will coincide with the form of the other and both will occur in the same period of time. The points 1 and 3 depict the maximum angular velocity and the points 2 and 4 the minimum angular velocity (compare with FIGS. 8 and 9). Points 3 and 4 represent the angular velocity for the tuning fork rotating mass and points 1 and 2 represent the maximum for the rotating gear wave shape. At the top of FIG. 10 it can be seen that the gear wave is shorter than the wave from the tuning fork, and in the lower part it can be seen that the gear wave form is longer than that of the tuning fork. Therefore, in either case, the wave forms are out of phase and inherently create forces which tend to put them back into phase. The energy for this correction comes from either the vibrating mass B of the tuning fork or from the non-linear drive means C, or gear train.

In the top of FIG. 10 where the drive means C is attempting to run faster than the oscillating mass B, the energy from the means C tends to increase the oscillating amplitude of the tuning fork. This continues to such a point that if an inordinate amount of energy were to be supplied the tuning fork would be torn apart (if sufficient energy were available). However, since the tuning fork is oscillating as it is rotating it has air friction and as the amplitude is increased this friction increases, and with a limited amount of energy from the drive means stabilization is reached before the tuning fork is damaged. In practice, a shield can be placed around the tuning fork so that when the tuning fork amplitude becomes greater than desired, it touches this shield and the friction between the tuning fork and the shield absorbs the excess energy. At the bottom of FIG. 10 the wave forms indicate that the drive means C tends to run at a slower speed than the oscillating mass B, and this is the condition that exists when the drive means is too weak or is run to the point where the drive spring, for example, is wound down. In this particular case, energy is transferred from the oscillating mass B to the drive means C, until the oscillations of the mass B are reduced and so weak that they are no longer effective to lock them in synchronism. However, so long as the tuning fork is oscillating at sufficient amplitude they are locked together, the same as a synchronous motor in relation to a synchronous generator.

The amplitude of the rotational velocity change of the drive means C and the vibration of mass B will be strictly equal at that point where neither is tending to drive the other. Under all other conditions the difference in amplitude between B and C will place a torque in shaft A and cause an instantaneous velocity change between B and C. Coupling mass B and drive means C together with a high hysteresis coupling shaft A will tend to act as an energy absorber and prevent an undesirable transfer of energy into vibrating the tuning fork. For example, the shaft A can be made from an elastomer in order to serve this purpose.

In FIG. 11 is shown a preferred form of mass B which, in actual practice, is vastly superior to the tuning fork depicted in FIG. 3. However, the mass or masses B of FIG. 11 will function in identically the same fashion as a conventional tuning fork of the type hereinabove referred to for illustrative purposes.

An advantage to be gained from the present invention is the ability to design the non-linear drive means C without particular concern for inertial effects. In practice, means C is a geared drive with an output gear 34 that rotates at a substantially constant and uniform velocity. In fact, it may be desirable to increase the rotational inertia of the output gear, by a fly-wheel action, in order to make the action more positive. For example, a compound differential gearing system can be used wherein the entire gear reduction from the power source, a spring, can be produced in a single stage.

A physical embodiment of the non-linear drive means C is shown in FIG. 12 whereby the smallest significant setting is .01 second and the maximum controllable time is 100 seconds. Hence, there are 10,000 readable significant settings between the minimum and the maximum. This is accomplished by two timings discs 10 and 20, the disc 10 setting to the closest second and the disc 20 setting the closest 1/100 second. For a normal sized device (as shown) this places the setting divisions about 1/16 inch apart, which is acceptably normal. The gearing system shown is a compound differential planetary gear. The barrel 30 containing the mainspring 31 directly drives the one set of planetary gears 32. Due to a slight difference between planetary gear diameters, the planet carrier 33 will rotate and cause the variable pitch diameter output gear 34 to drive the ellipsoidal pinion 35. Motion from the barrel 30 and from the planet carrier 33 is transferred by idlers 36 to the timing discs 10 and 20.

An advantage of the present invention is that the actual time factor for vibration or oscillation can be made as small as desired. For sake of statement, it is feasible to have hundreds of cycles per second, or thousands of cycles per second. It is merely necessary that a proper non-linear drive means C or gear train be designed to match. Furthermore, the overall accuracy of the device is limited only to the degree of accuracy of the oscillating mass B or tuning fork which is accepted as an exceedingly accurate timing device.

It becomes apparent that with an interchange of energy, less power is required to drive it than would be necessary in a system where energy is expended in starting and stopping. Thus, the size of the power means can be reduced, which is an advantage in timing devices of this nature.

Another advantage is that this device operates with continuity instead of starting and stopping for each time cycle division, and friction is not a determinant on whether it will start or not. Running friction is considerably lower than static or starting friction, and as a consequence the effect of friction is not as great as in a system that continuously starts and stops.

The present invention is particularly useful in a fuze in a projectile, in which case the design has to be made commensurate to the task to be performed. In a time fuze for a projectile it is assumed that the system would be in the wound-up condition prior to firing and that the release of setback forces would positively start the device running. The spin of the projectile will not affect the timing properties since the timing function is a relative matter between the oscillating mass B and the non-linear drive means C, and if both of these are placed in a medium where they are rotated together there is no effect upon the overall timing function of the device. Further, it is also obvious that if the time increments in this device are in the hundreds of cycles per second for example, then the actual time can be measured to within a fraction of a cycle or, for sake of statement, in a completely practical device, time can be split, for example, into $\frac{1}{500}$ of a second.

From the foregoing description and from the drawings a true and clear understanding of the invention is to be had. The idea of means disclosed can be incorporated in various physical embodiments, one of which is shown. Now then, instead of timing to $\frac{1}{10}$ second, which is the prior art accuracy with mechanical timers, the present invention enables timing to $\frac{1}{100}$ and $\frac{1}{1000}$, etc. second. This fineness of timing requires a more finely graduated reading scale, for instance one divided into 10,000 divisions as by the use of a pair of discs 10 and 20, as shown and described herein. Therefore, a very accurate timepiece or timer is provided wherein a vibrating or oscillating mass is employed as the governing time constant and which operates through the conservation of angular momentum to remain in sympathetic vibration or oscillation with a non-linear drive means that supplies the source of energy for continuous operation.

A model has been made in order to demonstrate the operation of this timing device and to provide a testing mechanism around which the various influencing parameters can be individually varied and studied. Basically, the model is powered by a clock motor consisting of a mainspring and a gear train. The usual escapement and escape wheel were removed and a non-linear gear set substituted. For expediency and simplicity, commercially available gears of equal diameter are used and the non-linearity characteristic obtained by eccentric mounting of the gears. This, of course, gives a net 1 to 1 ratio when examined on a one complete revolution basis with a sinusoidally varying ratio throughout this revolution. The degree of non-linearity or the instantaneous variation in relative angular velocity is capable of being varied by altering the degree of eccentricity. A specially designed wheel is attached to the output of this gear train. The rim is capable of radial vibration and the mass of the vibrating rim is alterable by the addition or repositioning of screws. For providing a high degree of flexibility in parameter variation, and to permit convenient study of the component interrelationship, a high hysteresis coupler is used between the non-linear gear output and the radially vibrating wheel.

FIG. 13 illustrates the results actually obtained with the model as above described, with the initial set of parameters. Here it can be seen that as long as the gear train is provided with sufficient energy to maintain the speed, the angular velocity or speed is constant. For the set of conditions of this experiment, this was for a period of eight minutes, and within this time there was no measurable variation.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A method of timing comprising revolving a radially vibratory element having a natural vibration frequency from a rotating drive means revolving it with a periodically varying angular velocity, the frequency of which variation is proportional to the angular velocity of the said drive means, while permitting the said element, by conservation of its angular momentum, to resist angular velocity variations asynchronous to its natural vibration frequency, whereby the said resistance compels the frequency of angular velocity variation to conform to the said natural vibration frequency, thereby regulating the velocity of the said rotating drive means.

2. A method of timing comprising revolving a radially vibratory element having a natural vibration frequency from a rotating drive means applying varying torque to revolve it with a periodically varying angular velocity, the frequency of which variation is proportional to the angular velocity of the said drive means, while permitting the said element, by conservation of its angular momentum, to resist angular velocity variations asynchronous to its natural vibration frequency, whereby the said resistance compels the frequency of angular velocity variation to conform to the said natural vibration frequency, thereby regulating the velocity of the said rotating drive means.

3. A method of timing comprising revolving a radially vibratory element having a natural vibration frequency from a rotating drive means applying varying torque to revolve it with a periodically varying angular velocity, the frequency of which variation is coincidental in time with the angular velocity variation of the said drive means, while permitting the said element, by conservation of its angular momentum, to resist angular velocity variations asynchronous to its natural vibration frequency, whereby the said resistance compels the frequency of angular velocity variation to conform to the said natural vibration frequency, thereby regulating the velocity of the said rotating drive means.

4. A timer comprising a revoluble radially vibratory mass having a natural frequency of radial vibration, a drive means for revolving said mass and to be speed regulated, and a means rotatably coupling the mass to the drive means and having a cyclically variable input-output speed ratio, whereby conservation of angular momentum of said revolving and radially vibrating mass will impose the natural vibration frequency thereof on said cyclical speed variation and thereby regulate the speed of said drive means.

5. A timer comprising a revoluble radially vibratory mass having a natural frequency of radial vibration, a drive means for revolving said mass and substantially at the velocity to be speed regulated, and a means rotatably coupling the mass to the drive means and having a cyclically variable input-output speed ratio, whereby conservation of angular momentum of said revolving and radially vibrating mass will impose the natural vibration frequency thereof on said cyclical speed variation and thereby regulate the speed of said drive means.

6. A timer comprising a revoluble radially vibratory mass having a natural frequency of radial vibration, a rotatable drive means for revolving said mass and to be speed regulated, a high hysteresis coupling means between said mass and said drive means, and the drive means having a cyclically variable input-output speed ratio, whereby conservation of angular momentum of said revolving and radially vibrating mass will tend to impose the natural vibration frequency thereof on said cyclical speed variation and thereby regulate the speed of said drive means.

7. A timer comprising a revoluble radially vibratory mass having a natural frequency of radial vibration, a drive means for revolving said mass and to be speed regulated, and a gearing mechanism coupling the mass to the drive means and having a cyclically variable input-output speed ratio, whereby conservation of angular momentum of said revolving and radially vibrating mass will impose the natural vibration frequency thereof on said cyclical speed variation and thereby regulate the speed of said drive means.

8. A timer comprising a revoluble radially vibratory mass having a natural frequency of radial vibration, a drive means for revolving said mass and to be speed regulated, and a gearing mechanism coupling the mass to the drive means and comprising intermeshed gears of variable pitch radius and having a cyclically variable input-output speed ratio, whereby conservation of angular momentum of said revolving and radially vibrating mass will impose the natural vibration frequency thereof on said cyclical speed variation and thereby regulate the speed of said drive means.

References Cited in the file of this patent

UNITED STATES PATENTS

| | | |
|---|---|---|
| 708,769 | Inden | Sept. 9, 1902 |
| 749,217 | Pagan | Jan. 12, 1904 |
| 1,975,308 | Ashdown | Oct. 2, 1924 |